United States Patent [19]
Albertazzi

[11] 3,889,380
[45] June 17, 1975

[54] AUTOMATIC MEASURING MACHINE FOR CHECKING SIMILAR WORKPIECES WITH AT LEAST ONE DIMENSION DIFFERENT

[75] Inventor: Gastone Albertazzi, Bologna, Italy

[73] Assignee: Finike Italiana Marposs, Soc. In Accomandita Semplice di Mario Possati & C., Bentivoglio (BO), Italy

[22] Filed: Feb. 28, 1973

[21] Appl. No.: 336,831

[30] Foreign Application Priority Data
Mar. 3, 1972 Italy.................................. 3354/72

[52] U.S. Cl............................... 33/174 L; 209/82
[51] Int. Cl. ............................................. G01b 7/12
[58] Field of Search......... 33/174 L, 178 E; 209/72, 209/74, 82

[56] References Cited
UNITED STATES PATENTS
3,079,678   3/1963   Aller et al. ...................... 33/174 L Primary Examiner—Richard E. Aegerter
Assistant Examiner—Willis Little
Attorney, Agent, or Firm—Stevens, Davis, Miller & Mosher

[57] ABSTRACT

An automatic measuring machine for checking a series of similar workpieces in which at least one dimension is different between workpieces. The machine includes a plurality of pre-checking stations each of which is adapted to pre-check one type of the series of workpieces and a measuring station having checking members which move into a plurality of working positions corresponding to the positions of the pre-checking stations and which is controlled by the pre-checking stations.

14 Claims, 5 Drawing Figures

AUTOMATIC MEASURING MACHINE FOR CHECKING SIMILAR WORKPIECES WITH AT LEAST ONE DIMENSION DIFFERENT

The present invention relates to an automatic measuring machine for checking a series of similar workpieces with at least one dimension different between them, by means of a single measuring station.

Modern automatic measuring machines for the final checking of the dimensions of mechanical workpieces normally comprise a conveyor, on to which the pieces are loaded at the outlet of the machining lines and which moves the workpieces with stepwise motion so as to bring them into positions corresponding with the various checking stations.

The first station is generally a pre-checking station. In it the workpiece is checked to ascertain that it has been machined sufficiently so as to avoid damaging the successive measuring station. Normally the pre-checking station consists of one or more plugs which descend on to the piece at the points to be checked. These plugs are mounted on the rod of a piston which re-enters if one of the points to be measured has not been sufficiently machined. Any recoil movement of the pre-checking plugs is used to indicate that the workpiece must be rejected before it arrives at the measuring station.

The workpieces which pass this pre-check are then fed to the measuring station in which the required dimensional measurements are made.

On the basis of the results of these measurements the workpiece is fed to the corresponding outlet. A measuring machine of this type is evidently constructed for checking one definite workpiece.

Because of their high cost, the use of these machines is limited in practice to mass production.

Technically to adapt one of these machines even to a similar workpiece means at least the replacement of the pre-checking and measuring stations. Both the cost and the time necessary for modifications of this type are unacceptable. In any case the problem of checking similar pieces which arrive mixed on the same line is not resolved.

The object of the present invention therefore is to provide an automatic measuring machine for checking similar workpieces with different dimensions which arrive in random order.

Other objects and advantages of the present invention will be hereinafter apparent in the course of the following description.

In accordance with the present invention the automatic measuring machine comprises a plurality of pre-checking stations each arranged to pre-check one type of a series of workpieces, and a measuring station the checking members of which are movable into a corresponding plurality of working positions, the movement of said checking members into one of said working positions being controlled by said pre-checking stations.

The following description relates to an automatic measuring machine according to a preferred embodiment of the present invention, given by way of non-limiting example with the aid of the accompanying drawings in which.

Figure 1:
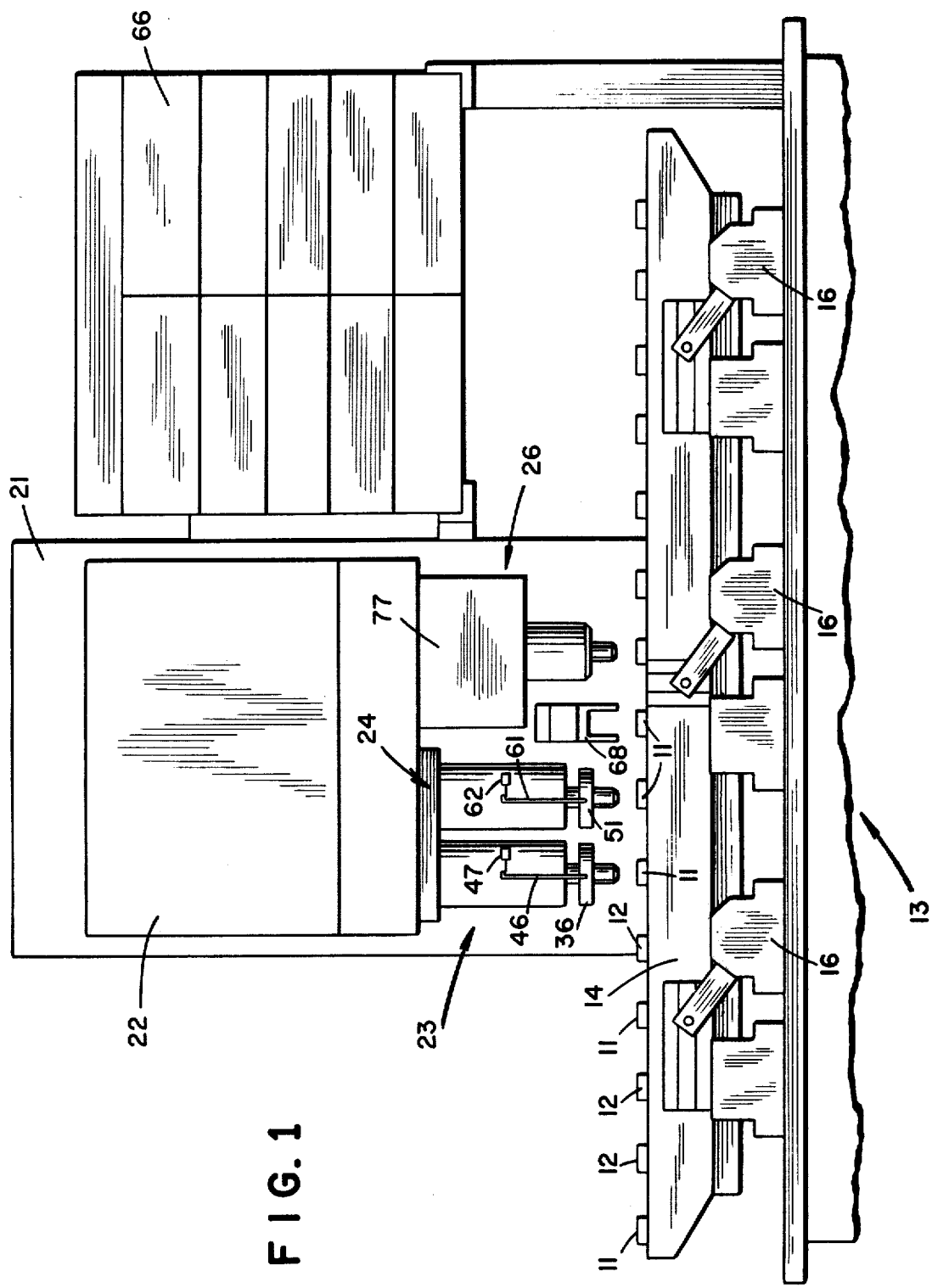
FIG. 1 is a diagrammatic front view of an automatic measuring machine according to the present invention.
Figure 5:
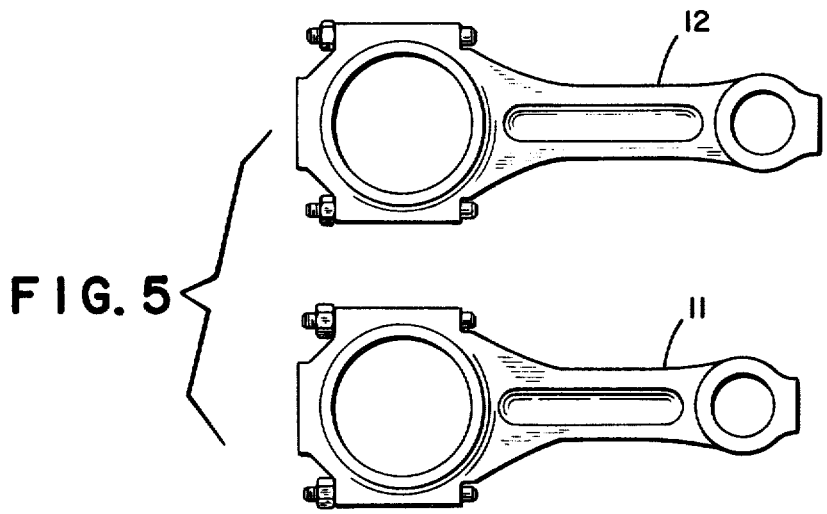
FIG. 5 is a plan view of the workpieces to be checked.
Figure 4:
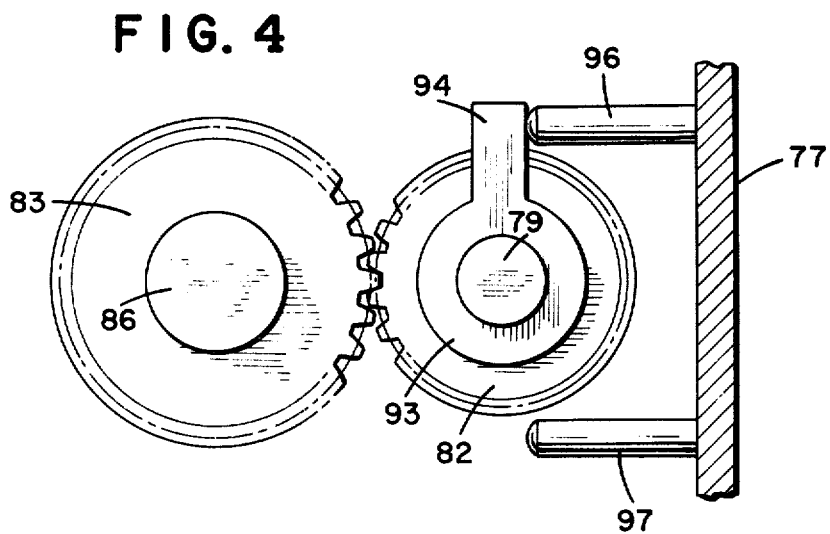
FIG. 4 is a partially sectioned plan view of a detail of FIG. 3.

FIG. 1 shows diagrammatically a measuring machine for checking two connecting rods 11 and 12 (FIG. 5) in which the distances between the axes of their two ends are different. The machine consists of a bed 13 of steel on which a conveyor 14 moves with stepwise motion by means of a known hydraulic system 16. The connecting rods 11 and 12 are loaded on to the conveyor 14 in the random order in which they arrive. On a bed 13 is fixed a turret 21 on which a slide 22 slides in a known manner, and supports a pair of pre-checking units 23 and 24 and a measuring unit 26.

The units 23 and 24 consist respectively of a pair of plugs 31, 32, and 33, 34. The distance between the axes of the two plugs 31 and 32 corresponds to the nominal distance between the axes of the ends of the connecting rods 11, whereas the distances between the axes of the plugs 33 and 34 corresponds to that between the ends of the connecting rods 12.

The plugs 31 and 32 are disposed on a plate 36 fixed to the rod 37 of a piston 38 slidable within a cylinder 39 and normally thrust downwards by a spring 41 against a stop 42. The movement of the plate 36 is guided by a piston 43 slidable within a cylinder 44.

Figure 2:
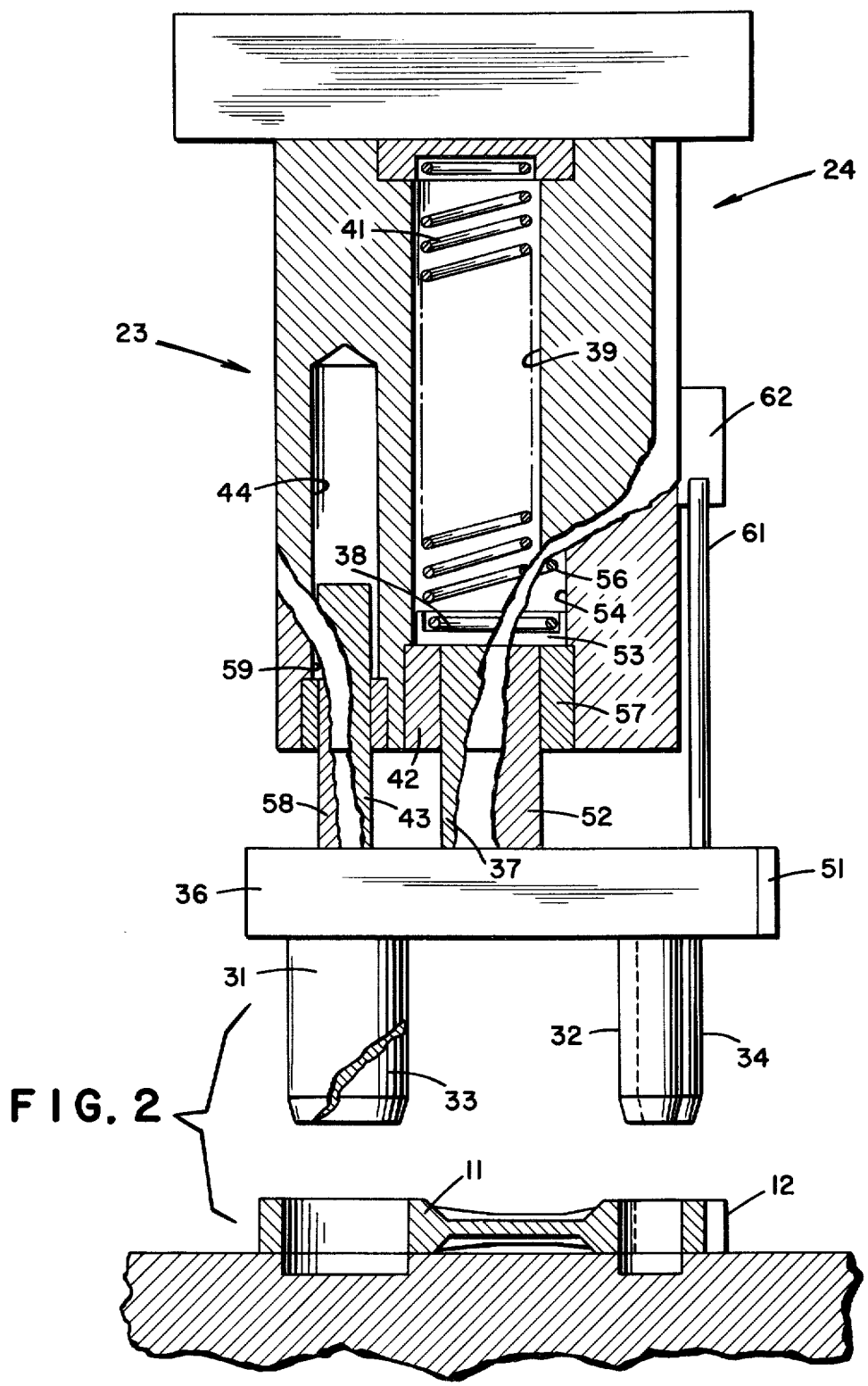
FIG. 2 is a partially sectioned left side view of a detail of FIG. 1.

To the plate 36 (FIG. 1) is also fixed a bar 46 arranged to control a microswitch 47 fixed on the pre-checking station 23. Likewise, the plugs 33 and 34 (FIG. 2) are disposed on a plate 51 fixed to the rod 52 of a piston 53 slidable within a cylinder 54 and normally thrust downwards by a spring 56 against a stop 57. The movement of the plate 51 is guided by a piston 58 slidable within a cylinder 59. To the plate 51 is also fixed a bar 61 arranged to control a microswitch 62 fixed to the pre-checking station 24. The microswitches 47 and 62 are connected to an electronic control unit 66.

Figure 3:
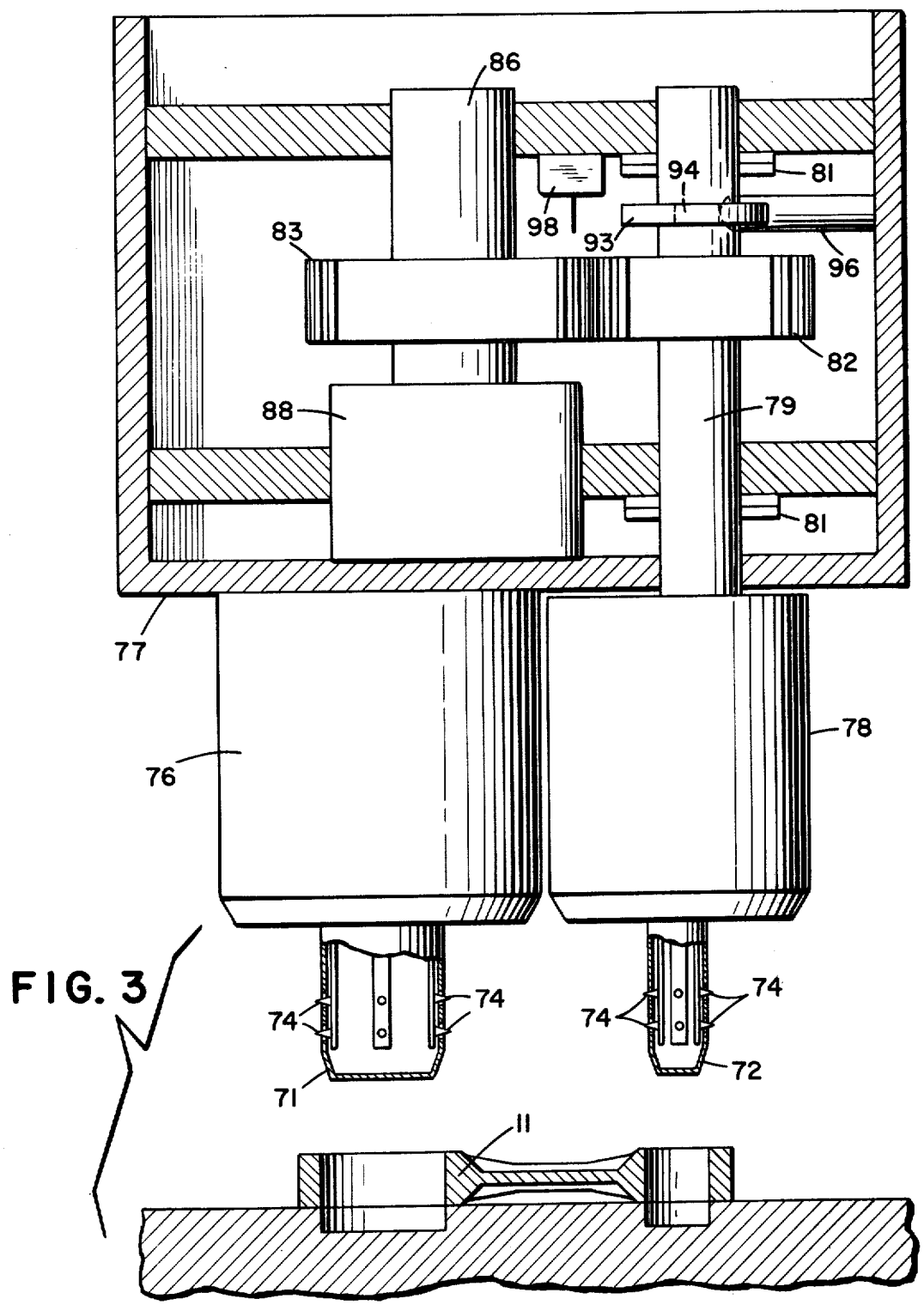
FIG. 3 is a partially sectioned left side view of a second detail of FIG. 1.

Immediately downstream of the pre-checking stations there is an expulsion station for those connecting rods to be rejected. The expulsion is effected by means of a spike 68 arranged to move the connecting rods to be rejected on to an exit chute of known type and not shown in the drawings. The connecting rods accepted at the pre-check finally arrive at the measuring station. The measuring unit 26 (FIGS. 1 and 3) also consists of a pair of plugs 71 and 72 arranged for insertion into the big and small ends respectively of the connecting rod for carrying out the required checks.

The checks are made by means of a suitable set of feelers 74 which in a known manner not shown in the drawings control a corresponding series of position transducers arranged to measure the dimensions of the connecting rod under examination.

The plug 71 is fixed to a body 76 for containing said position transducers and rigidly connected to a box 77 on the slide 22. The plug 72 is fixed to a body 78 for containing the position transducers and fixed in its turn eccentrically on a shaft 79. The shaft 79 is supported so as to be able to rotate on two bearings 81 fixed to the frame of the box 77, and is provided with a gearwheel 82 which meshes with a gearwheel 83 fixed on a shaft 86 of an electric motor 88.

The eccentricity of the shaft 79 with respect to the body 78, and hence to the plug 72, is equal to one half of the difference between the distances between the axes of the connecting rods 11 and 12.

Finally on the shaft 79 there is a disc 93 with a projection 94 arranged to cooperate with two stops 96 and 97 fixed to the box 77. The motor 88, suitably driven, is arranged to selectively bring the projection 94 against one of the two stops 96 and 97 by making the shaft 79 carry out a rotation of 180°. During the rotation the projection 94 also operates a microswitch 98 which signals to the control unit 66 the position of the shaft 79 and hence of the plug 72.

The operation of the machine is as follows:

When the connecting rods 11 and 12 have been loaded on to the conveyor 14, they are moved stepwise by it by means of the system 16. Each connecting rod 11 and 12 then passes below the two pre-checking stations 23 and 24 and is explored both by the plugs 31, 32 and by the plugs 33, 34.

At the end of these pre-checking operations, four conditions may be verified for each individual connecting rod. In the first case both the plugs 31, 32 and the plugs 33, 34 have been unable to descend completely because the connecting rod is misplaced on the conveyor or not properly machined. In this case the connecting rod must definitely be rejected. This fact is indicated by the energizing in succession of the two microswitches 47 and 62.

The spike 68, under the control of the unit 66, expels the connecting rod through the corresponding exit chute.

In the second case the pair of plugs 31, 32 and 33, 34 are both able to descend completely. This indicates that there is either no connecting rod present or that the connecting rod present must be rejected. The spike 68 is operated also in this case so as to expel any connecting rod present.

In the third case the pair of plugs 31, 32 is able to descend regularly whereas the pair of plugs 33, 34 is blocked by the impact of one of them against the connecting rod. The microswitch 62 is energized and signals to the control unit 66 the fact that the connecting rod concerned is the connecting rod 11.

Finally in the fourth case the pair of plugs 31, 32 is blocked by the connecting rod whereas the pair of plugs 33, 34 descends regularly. The microswitch 47 is thus energized and signals to the control unit 66 that the connecting rod concerned is a connecting rod 12. The details of the connecting rod at the outlet of the pre-checking stations are memorized by the control unit 66, which on the basis of this information controls the position of the measuring plug 72 in such a manner as to adapt it to the different distances between axes of the connecting rods 11 and 12.

If a connecting rod arriving at the measuring station is shown to be of the same type as the preceding one, the measuring station is left in the same position. If, however, the connecting rod to be checked is a connecting rod 12 whereas the preceding one was a connecting rod 11, for example, the measuring station must be adapted to the new situation. For measuring a connecting rod 11 the measuring station is in the position shown in FIG. 3. On arrival of the connecting rod 12 the motor 88 is operated so as to rotate the gearwheel 83 clockwise. In consequence the gearwheel 82 rotates counterclockwise until the projection 94 engages with the stop 97.

The rotation made is one of 180°. The axis of the plug 72 is brought, with respect to the axis of the shaft 79, in a position diametrically opposite to that in which it was previously, and it is moved, with respect to the axis of the plug 71, by a distance equal to double the eccentricity existing between the shaft 79 and the plug 72. The distance between the axes of the plugs 71 and 72 becomes equal to that of the connecting rod 12.

The movement is signalled by the microswitch 98 to the control unit 66, which in its turn switches the processing unit for the measurements, now shown in the drawings, to the values relative to the connecting rod being examined.

If, however, a connecting rod 12 arrives and then a connecting rod 11, the movement of the plug 72 takes place in the opposite direction, but substantially in the same manner.

It is evident that various modifications may be made to the devices described without leaving the scope of the invention. For example, the movement of the plug 72 may be carried out by linear sliding of a slide on a suitable guide. Moreover it is evident that the machine described may be used for measuring similar pieces which instead of differing by the distance between two bores differ by the diameter of two bores, for example by disposing two measuring plugs of different diameter on a rotating disc or on a slide. Finally by combining that stated above, similar pieces which differ one from the other by more than one dimension may be checked by the same principles.

What is claimed is:

1. An automatic measuring machine for checking a series of similar workpieces of a plurality of types differing for at least one nominal dimension comprising pre-checking means adapted to identify the type; a measuring unit having adjustable measuring means; and control means coupled to said pre-checking means and to said measuring unit to adjust said measuring means for carrying out, measurements on said plurality of types of workpieces.

2. The automatic measuring machine as claimed in claim 1, wherein said pre-checking means comprises a plurality of pre-checking units corresponding to said plurality of types of workpieces.

3. The automatic measuring machine as claimed in claim 2, wherein each pre-checking unit comprises a pre-checking device shaped depending on a corresponding one of said plurality of types of workpieces and a detecting device connected with the pre-checking device for detecting the result of the pre-checking made by the pre-checking device.

4. The automatic measuring machine as claimed in claim 3, wherein the detecting device of each pre-checking unit comprises an on-off device adapted to provide an output signal indicating whether the workpiece does or does not belong to a corresponding one of said types.

5. The automatic measuring machine as claimed in claim 4, wherein the detecting devices of the plurality of pre-checking units are operatively connected with a control unit adapted to operate an ejection device for ejecting from the machine the workpieces negatively pre-checked by all of the pre-checking units and the work pieces positively pre-checked by at least two pre-checking units.

6. An automatic measuring machine for checking geometrical features on a series of similar workpieces of a plurality of types, said types differing from each other by at least one nominal dimension comprising:
   a. conveyor means for transporting sequentially the workpieces;
   b. a plurality of pre-checking units subsequently placed along said conveyor means for pre-checking the workpieces carried thereby, each pre-checking unit including:
      $b_1$. a pre-checking device for checking a dimension of the workpieces, each pre-checking device being arranged depending on a corresponding one of said plurality of types, and
      $b_2$. circuit means connected with said pre-checking device for providing a control signal responsive to the pre-checking made by the pre-checking device;
   c. a measuring unit for carrying out measurements on said plurality of types of workpieces, said measuring unit comprising adjustable measuring means adaptable to said plurality of types of workpieces; and
   d. control means connected with the circuit means of the pre-checking units and with the adjustable measuring means of the measuring unit for automatically adjusting the measuring means depending on the type of workpiece to be measured.

7. The automatic measuring machine as claimed in claim 6, wherein said pre-checking device comprises a checking member displaceable towards and away from said conveyor means.

8. The automatic measuring machine as claimed in claim 6, further including an ejection device arranged at said conveyor means upstream of said measuring unit and wherein said control means is adapted to operate the ejection device to eject from the machine the pre-checked workpieces which do not belong to any of said plurality of types.

9. The automatic measuring machine as claimed in claim 6, in which said nominal dimension is the distance between two parts or axes of the workpieces and in which said measurements are to be carried out in correspondence of said two parts, wherein said adjustable measuring means comprises two measuring devices for measuring the two parts, respectively; at least one of said measuring devices being mounted on movable support means adapted to cooperate with stop means defining a plurality of operating positions for the measuring device, the number of operating positions corresponding to the number of said types of workpieces, whereby said control means is adapted to control the displacement of the measuring device in a selected position for measuring all of the types of workpieces by the same two measuring devices.

10. The automatic measuring machine as claimed in claim 6, in which the shape of the workpieces defines two bores whose center-to-center nominal distance corresponds to said nominal dimension, said nominal distance having two possible values defining two types of workpieces, wherein two of said pre-checking devices are provided, each consisting of a pair of pre-checking plugs adapted to be moved towards and away from the workpieces to be pre-checked for checking whether the plugs of each pair may enter into said bores.

11. The measuring machine as claimed in claim 10, wherein said adjustable measuring means comprises two measuring plugs each having a diameter adapted to allow the measuring plug to enter into a corresponding one of said bores of the workpieces, at least one of said measuring plugs being carried by a movable support adapted to cooperate with stops defining two operating positions of the two measuring plugs, said control means being connected with the movable support for moving it to either of the two operating positions, for permitting both the measuring plugs to enter contemporaneously into the bores of a workpiece.

12. The measuring machine as claimed in claim 11, wherein said movable support comprises a rotatable shaft eccentrically supporting the measuring plug and wherein said control means comprises a motor coupled through gear means with said rotatable shaft for rotating the same.

13. The measuring machine as claimed in claim 12, wherein said shaft carries a projection and said stops comprise two stops adapted to cooperate with said projection for defining two operating positions of the shaft, these positions being spaced 180° apart.

14. The measuring machine as claimed in claim 13, wherein said control means comprises switch means cooperating with said projection for indicating the actual positions of said shaft.

* * * * *